(12) United States Patent
Bustamante et al.

(10) Patent No.: US 7,466,629 B1
(45) Date of Patent: Dec. 16, 2008

(54) MANUALLY AGITATED UNDERWATER SIGNALING DEVICE

(76) Inventors: Michael John Bustamante, 1501 Plantation Dr., Southlake, TX (US) 76092; Brian A. Amond, 1401 Plantation Dr., Southlake, TX (US) 76092; Anthony M. Scott, 103 Braddock Ct., Southlake, TX (US) 76092

( * ) Notice: Subject to any disclaimer, the term of this patent is extended or adjusted under 35 U.S.C. 154(b) by 604 days.

(21) Appl. No.: 11/247,808

(22) Filed: Oct. 11, 2005

Related U.S. Application Data

(60) Provisional application No. 60/617,731, filed on Oct. 12, 2004.

(51) Int. Cl.
*H04B 11/00* (2006.01)
(52) U.S. Cl. .................... 367/134; 367/142; 340/850
(58) Field of Classification Search ......... 367/131–134, 367/137, 140–142; 340/850
See application file for complete search history.

(56) References Cited

U.S. PATENT DOCUMENTS 5,187,691 A * 2/1993 Oehme et al. ............... 367/134

* cited by examiner

*Primary Examiner*—Timothy Edwards, Jr.

(57) ABSTRACT

A Manually Agitated Underwater Signaling Device used for SCUBA divers, snorkelers and other water-sport enthusiasts. The Manually Agitated Underwater Signaling Device includes a water tight right circular cylindrical body containing one or more rigid spheres inside, an integrated slot for the connection of a lanyard to one end of the right circular cylindrical body and a spherical base integrated into the other end of the right circular cylindrical body. The right circular cylindrical body is comprised of two body halves, a right half and a left half. The right half includes a tongue ridge with an energy director around the perimeter forming a mating surface. The left half includes a recessed groove around its perimeter forming a mating surface that intersects with the right half when aligned together. The Manually Agitated Underwater Signaling Device includes an exterior surface texture to improve the grip. A lanyard will be attached to the device through the integrated lanyard slot to help maintain a secure hold on the device when in use.

20 Claims, 1 Drawing Sheet

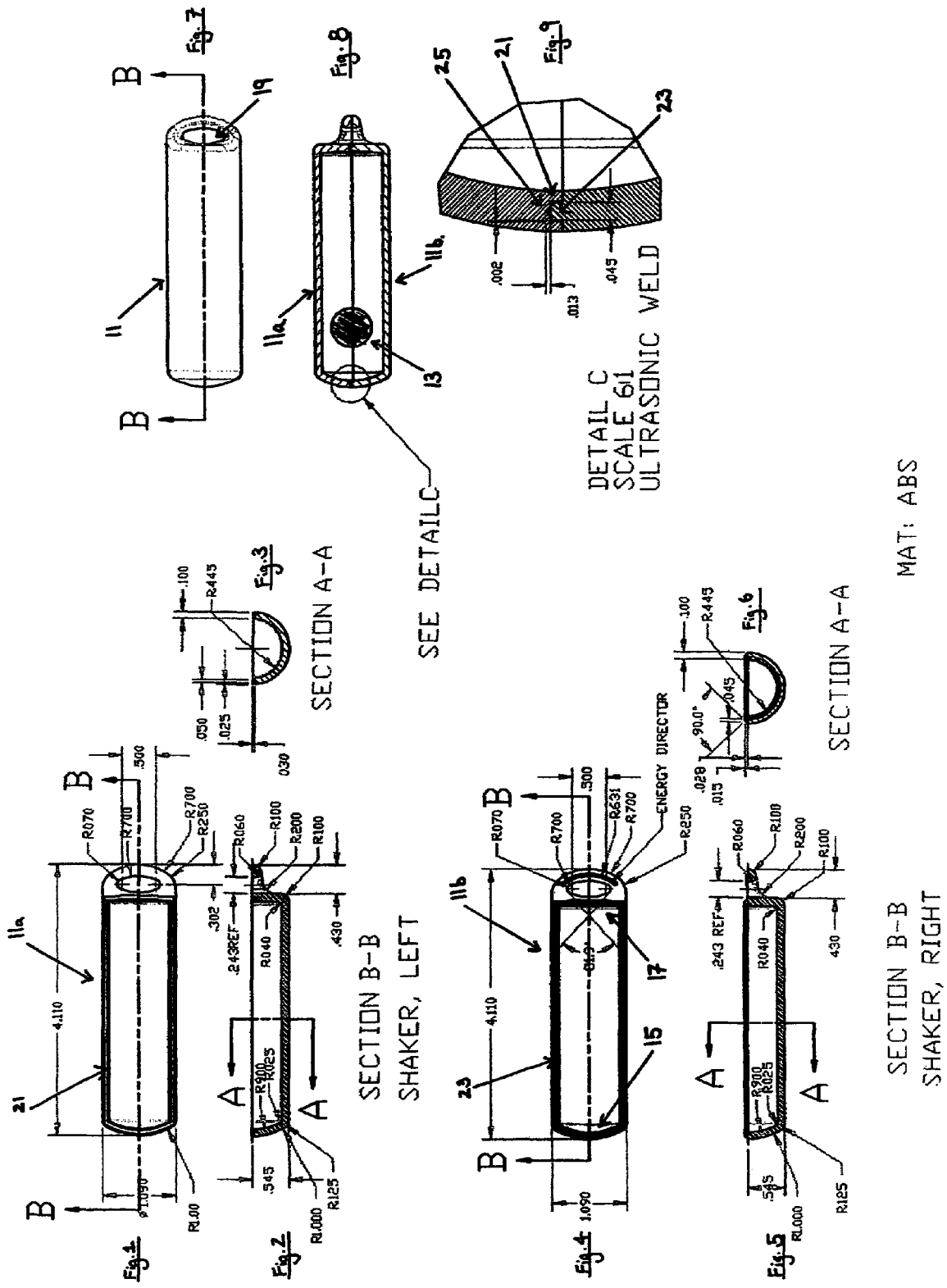

US 7,466,629 B1

MANUALLY AGITATED UNDERWATER SIGNALING DEVICE

CROSS-REFERENCE TO RELATED APPLICATIONS

This application claims the benefit of U.S. Provisional Patent Application No. 60/617,731, filed Oct. 12, 2004 (entitled "A Manually Agitated Underwater Signaling Device"), and applicant incorporates the entirety of that provisional patent application herein by reference.

BACKGROUND OF THE INVENTION

This invention relates to underwater signaling devices used by scuba divers, snorkelers, and other water-sports enthusiasts to obtain the attention of others underwater. SCUBA is an acronym referring to divers using a Self-Contained Underwater Breathing Apparatus.

Prior Art Underwater Signaling Devices in General

Underwater signaling devices have been used in scuba diving for years. Some underwater signaling devices use air from the scuba tank which produces an audible low-frequency horn-like sound. Others are designed to bang against the outside of the scuba tank which produces an audible low-frequency clanking-type sound. Other hand activated devices produce an audible low-frequency single click type sound.

A key need: simple, inexpensive signaling devices tailored for audible communication.

To understand this, it must first be understood that sensory limitations, specifically visual and auditory limitations, make the scuba diving experience a somewhat isolating one. For example, because of the visual limitations inherent in scuba diving, divers typically cannot gain the attention of their diving buddy, despite the fact that they are in close proximity to one another.

In addition, auditory limitations, specifically the inability of other divers to hear the human voice, even when a diver is screaming or yelling underwater just a few feet away, force divers to rely almost entirely upon their limited sense of sight, specifically line-of-sight, to attract the attention of their dive buddy, and this is a serious limitation even in good visibility situations.

Furthermore, the limitations of existing devices due to the fact that their function is dependent upon diving equipment (i.e. scuba tank, buoyancy compensation device (BCD) and regulator) makes them useless to all water-sports enthusiasts except scuba divers. This integration requirement introduces the potential for equipment failure and damage, as well as (in the case of pneumatic devices) the accelerated depletion of a diver's air supply, his/her most essential survival necessity.

It is to these underwater communication needs, and other circumstances in which the attention of others is desired, that the instant invention is directed.

BRIEF SUMMARY OF THE INVENTION

The invention disclosed herein provides a manually operated signaling device producing a dual low-frequency rattle-type sound through the use of impacters (typically rigid spheres, although other shapes of objects, featuring varying degrees of rigidity, may be used for specialized applications) striking two distinctly different inner plastic surfaces specifically designed for optimal sound transmission.

The Manually Agitated Underwater Signaling Device (M.A.U.S.D.) comprises a (a) left half of the body with a groove for bonding and sealing; (b) a right half of the body with a tongue (to fit into the groove) for bonding and sealing; (c) one or more rigid spheres contained within the cavity formed when the left and right halves are joined and sealed designed to produce an audible signal when striking either interior end of the cavity, said cavity having one flat interior end and the other interior end with a convex curvature; and (d) an integrated slot to facilitate the attachment of a lanyard or other accessory to enable the invention to be secured to either the diver or a piece of the diver's equipment. In typical uses, as indicated above, the dual-frequency audible signal produced enables the diver to rapidly and effectively signal those around him.

BRIEF DESCRIPTION OF THE SEVERAL VIEWS OF THE DRAWINGS

FIG. 1 is a top view of the left half of the present invention.

FIG. 2 is a left side cutaway view of the invention in FIG. 1.

FIG. 3 is a left side cutaway view of the invention in FIG. 2.

FIG. 4 is a top view of the right half of the present invention.

FIG. 5 is a left side cutaway view of the invention in FIG. 4.

FIG. 6 is a left side cutaway view of the invention in FIG. 5.

FIG. 7 is a bottom (or top) view of the invention in FIG. 1.

FIG. 8 is a left side cutaway view of the assembled invention.

FIG. 9 is a detailed view of the ultrasonic weld in FIG. 8.

DETAILED DESCRIPTION OF THE INVENTION

Overview of the Invention.

General Considerations.

In general, communications underwater are restricted because of visual limitations and auditory limitations. Typical visual and auditory ranges are limited to a few yards. Current state of the art has not been able to exceed these limitations.

Important Invention Objectives.

A key objective of the Manually Agitated Underwater Signaling Device, when agitated, is to produce a distinctive oscillating audible signal detectable by the human ear underwater. This audible signal is easily discernable from typical background noise that divers encounter underwater, due to the dual-frequency sound emitted.

A second key objective of the Manually Agitated Underwater Signaling Device is to function independently of other pieces of the diver's equipment. The unit's ability to function independently is advantageous because a) it doesn't deplete the diver's air supply as some other signaling devices do, b) it can't be forgotten and left on the outside of the diver's air tank like other signaling devices, and c) it can be used by other water sports enthusiasts such as snorkelers or swimmers who do not use scuba diving equipment such as air tanks or BCD's.

A third key objective of the Manually Agitated Underwater Signaling Device is to aid in the identification of the source of the signal (i.e. the diver seeking to gain the attention of other divers) via the combination of the dual-frequency sound produced by the unit and the motion of the diver's hand as he/she manually agitates the device in front of their body. Other signaling devices either require no (or such little movement as to be unnoticeable, as is the case with pneumatic devices) movement of the hand or are located behind the diver's back so that the movement of the diver's hand is obscured from those whose attention he/she is trying to gain.

A fourth key objective of the Manually Agitated Underwater Signaling Device is to be of a convenient size and weight so as to not be hindrance to the diver during his/her dive. The compact size and shape of the unit allows the diver to easily store the Manually Agitated Underwater Signaling Device in the pocket of their BCD or to attach it to either the exterior of their BCD or their wrist. This makes it possible to carry the M.A.U.S.D. without it interfering with or getting in the way of normal dive activities.

A fifth key objective of the Manually Agitated Underwater Signaling Device is to provide a reliable means of underwater signaling that is virtually impervious to leaks underwater. The Manually Agitated Underwater Signaling Device comprises two plastic halves which are ultrasonically welded together to form a water-tight seal. This method of sealing the unit is far superior to the use of rubber o-rings which must be properly maintained and can still fail even when properly maintained.

A sixth key objective of the Manually Agitated Underwater Signaling Device is to provide an underwater signaling device which is corrosion and dent proof. Because the Manually Agitated Underwater Signaling Device is manufactured from plastic (namely ABS) it will not become corrosive in a salt water environment like units made from aluminum or other metals will. Two dissimilar metals in the presence of an electrically conductive fluid, such as salt water, will experience galvanic corrosion. Due to our device's plastic construction damage to other pieces of dive equipment made of metal will not occur and staining of dive equipment such as the diver's BCD will be prevented. Due to its construction the unit will also withstand impacts that would dent units made from aluminum, giving our product a longer usable lifespan.

DETAILED DESCRIPTION

With reference now to the drawings, and in particular with reference to FIG. 8, a preferred embodiment of the M.A.U.S.D. (Manually Agitated Underwater Signaling Device) 11 of the present invention is illustrated. Reference to this figure, as well as FIGS. 1 and 4 (which depict the invention's separate assemblies), reveals that the invention comprises a left-hand assembly 11a (FIG. 1) and a right-hand assembly 11b (FIG. 4).

As is evident in FIG. 1, typically the M.A.U.S.D. has a water tight body length of approximately 4 inches, is cylindrical in shape with a diameter of approximately 1 inch. Device 11 is preferably manufactured of high grade plastic resin or compound or other appropriate material.

Left-hand assembly 11a is composed of durable material such as ABS (Acrylonitrile-butadiene-styrene), PBT (Polybutylene Terephthalate), or other durable material, or any suitable material including but not limited to plastic resins or compounds. This left-hand assembly 11a is joined to right-hand assembly 11b to form watertight body 11. Left-hand assembly 11a is hollow inside to form hollow assembly 11 when combined with right-hand assembly 11b. The left-hand assembly 11a has groove 21 molded into the perimeter of the hollowed-out section which facilitates the joining of the two assemblies to form the watertight body 11.

Right-hand assembly 11b is also composed of durable material such as ABS, PBT, or other durable material, or any suitable material including but not limited to plastic resins or compounds. This right-hand assembly 11b is joined to left-hand assembly 11a to form watertight body 11. Right-hand assembly 11b is hollow inside to form hollow assembly 11 when combined with left-hand assembly 11a. The right-hand assembly 11b has tongue 23 molded into the perimeter of the hollowed-out section which facilitates the joining of the two assemblies to form the watertight body 11. With reference now to FIG. 9 the tongue has a small ridge on top of it which is energy director 25, to facilitate the joining of the right-hand assembly to the left-hand assembly via ultrasonic welding to form a watertight seal as is evident in FIG. 9.

Watertight body 11 is comprised of left-hand assembly 11a and right-hand assembly 11b ultrasonically welded to form watertight assembly 11. FIG. 8 illustrates that the assembled invention will contain one or more rigid spheres 13. These spheres enable the assembly to produce a dual low frequency rattle-type sound when agitated manually. Spheres 13 are composed of a rigid durable material such as carbon-steel, stainless steel, iron or other durable material, or any suitable material including but not limited to ferrous metals or other metals and alloys.

When the M.A.U.S.D. is shaken vigorously by the user underwater, the rigid spheres strike the two ends of the hollow, watertight cavity formed when assemblies 11a and 11b are joined and sealed. The frequencies of the sounds produced by the impact of these spheres are dictated by the size and material properties of spheres 13 as well as the size, shape, material and wall thickness of assembly 11 itself. These frequencies are the crux of the effectiveness of underwater signaling and communication.

As sound or any other form of energy travels through a medium, such as air or water, there are many factors which influence the distance the energy is able to travel. With sound waves, the distance traveled by a noise is primarily influenced by the velocity of the sound and also the rate at which the sound attenuates. In liquids, this velocity is proportional to the bulk modulus (a volumetric measure of elasticity) of the liquid and to the density of the liquid (or other medium through which the sound is traveling). Therefore the velocity of sounds through liquids is generally higher than in gases, due to their higher densities, and higher bulk modulus.

Factors which influence the attenuation of sound in water are absorption and scattering, with absorption being the more dominant of the two. Absorption of sound in water is most sensitive to changes in frequency; and increases as the square of frequency. That being said, the lower the frequency, the less the attenuation of the sound. The dual low frequency rattle-type sound produced by the M.A.U.S.D. is therefore ideal for traveling longer distances underwater and therefore more effective for signaling and communicating.

A second characteristic of the sound produced by the M.A.U.S.D. when used underwater is the dual-frequency emitted. Due to the two different shaped ends of the hollow cavity formed when the left and right halves of the device are joined and sealed, a different frequency is produced at flat inner surface 17 than is produced at convex inner surface 15. This dual-frequency makes the sound produced by the M.A.U.S.D. more easily distinguishable from typical background noise encountered underwater and makes the device a more effective means of communication than other devices which have two identical ends producing identical sounds.

Illustrative Implementation.

The following listing provides information relating to an illustrative implementation of the invention. The information provided does not represent the only mode of implementation; rather, it represents one embodiment of many of the invention elements, for which there may well be numerous equivalents.

11. Preferred Embodiment/Device body
   Plastic resin or compound or other appropriate material
   Hollow so as to contain all components
   Watertight
   Impact resistant 11a. Left-Hand Assembly
   Approximately ⅛" thick
   Perimetered with groove
   Interior convex at spherical end
   Interior flat at integrated lanyard slot end
   Exterior surface textured to improve grip 11b. Right-Hand Assembly
   Approximately ⅛" thick
   Perimetered with tongue with energy director
   Interior convex at spherical end
   Interior flat at integrated lanyard slot end
   Exterior surface textured to improve grip 13. Rigid Sphere
   ⅜" diameter or other suitable diameter
   Carbon steel or other suitable material 15. Convex Inner Surface
   Sized appropriately for maximum impact of rigid spheres
   Formed when assemblies 11a and 11b are mated together
   Designed to produce a audibly different sound than Flat Inner Surface 17

17. Flat Inner Surface
   Sized appropriately for maximum impact of rigid spheres
   Formed when assemblies 11a and 11b are mated together
   Designed to produce a audibly different sound than Convex Inner Surface 15

19. Integrated Lanyard Slot
   Formed when assemblies 11a and 11b are mated together
   Sized to accommodate a lanyard or other attachment device 21. Groove
   Molded into the perimeter of Left-Hand Assembly 11a.
   Designed to fit over and be welded to Tongue 23

23. Tongue
   Molded into the perimeter of Right-Hand Assembly 11b.
   Designed to fit into and be welded to Groove 21

25. Energy Director
   Located on top of Tongue 23
   Designed to facilitate the ultrasonic welding process

We claim:

1. A dual-tone signaling device comprising:
   (a) a body, said body comprising a cylindrical inner cavity featuring a flat inner surface at an end and a convex-outward inner surface at another end; and
   (b) one or more impacters, said impacters contained within said cylindrical inner cavity and producing a dual-frequency notification signal when said dual-tone signaling device is manually agitated.

2. The dual-tone signaling device of claim 1 wherein at least one of said one or more impacters features a substantially spherical shape.

3. The dual-tone signaling device of claim 1 wherein said body comprises an exterior surface of plastic.

4. The dual-tone signaling device of claim 1 wherein at least one of said one or more impacters comprises an exterior surface of carbon-steel.

5. The dual-tone signaling device of claim 1 wherein at least one of said one or more impacters comprises an exterior surface of stainless steel.

6. The dual-tone signaling device of claim 1 wherein at least one of said one or more impacters comprises an exterior surface of iron.

7. A dual-tone signaling device comprising:
   (a) a watertight body, said watertight body comprising a cylindrical inner cavity featuring an inner surface at one end featuring a first radius of curvature and an inner surface at another end featuring a second different radius of curvature; and
   (b) one or more impacters, said impacters contained within said cylindrical inner cavity and producing a dual-frequency notification signal when said dual-tone signaling device is manually agitated.

8. The dual-tone signaling device of claim 7 wherein at least one of said one or more impacters features a substantially spherical shape.

9. The dual-tone signaling device of claim 7 wherein said watertight body comprises an exterior surface of plastic.

10. The dual-tone signaling device of claim 7 wherein at least one of said one or more impacters comprises an exterior surface of carbon-steel.

11. The dual-tone signaling device of claim 7 wherein at least one of said one or more impacters comprises an exterior surface of stainless steel.

12. The dual-tone signaling device of claim 7 wherein at least one of said one or more impacters comprises an exterior surface of iron.

13. A dual-tone signaling device comprising:
   (a) a body, said body comprising an inner cavity featuring an inner surface at one end featuring a first nonzero radius of curvature and an inner surface at another end featuring a second different radius of curvature; and
   (b) one or more impacters, said impacters contained within said inner cavity and producing a dual-frequency notification signal when said dual-tone signaling device is manually agitated.

14. The dual-tone signaling device of claim 13 wherein at least one of said one or more impacters features a substantially spherical shape.

15. The dual-tone signaling device of claim 13 wherein said watertight body comprises an exterior surface of plastic.

16. The dual-tone signaling device of claim 15 wherein said plastic is acrylonitrile-butadiene-styrene.

17. The dual-tone signaling device of claim 15 wherein said plastic is polybutylene-terephthalate.

18. The dual-tone signaling device of claim 13 wherein at least one of said one or more impacters comprises an exterior surface of carbon-steel.

19. The dual-tone signaling device of claim 13 wherein at least one of said one or more impacters comprises an exterior surface of stainless steel.

20. The dual-tone signaling device of claim 13 wherein at least one of said one or more impacters comprises an exterior surface of iron.

* * * * *